Patented Mar. 14, 1933　　　　　　　　　　　　　　　　　　1,901,844

UNITED STATES PATENT OFFICE

CHRISTIAN J. HANSEN, OF ESSEN-ON-THE-RUHR, GERMANY, ASSIGNOR, BY MESNE ASSIGNMENTS, TO THE KOPPERS COMPANY OF DELAWARE, OF PITTSBURGH, PENNSYLVANIA, A CORPORATION OF DELAWARE

TREATING THIOCYANATES

No Drawing. Application filed August 9, 1928, Serial No. 298,617, and in Germany April 14, 1928.

My invention refers to the treatment of thiocyanogen compounds and more especially ammonium thiocyanate, whereby a decomposition of such compounds is obtained and ammonium compounds, such as ammonium sulfate, are recovered. It is an object of my invention to provide means whereby this decomposition of the thiocyanogen compounds and conversion into ammonium sulfate can be effected in a simpler and more efficient manner and at lower cost, than was hitherto possible. Another object of my invention is to utilize the sulfur contained in the thiocyanogen molecule and to recover it in the form of free sulfur or of valuable sulfur compounds, such as hydrogen sulfide, or of sulfate.

Hitherto solutions of ammonium thiocyanate, such as resulted for instance in the purification of gases developed in the distillation of carbon and other carbonaceous material, have been subjected to hydrolytic decomposition by heating same with acids, more especially with dilute sulfuric acid. This decomposition results in the formation of ammonium sulfate and carbon oxysulfide, which is partly decomposed in the presence of water into carbon dioxide and hydrogen sulfide. This way of proceeding entails the drawback that it requires a considerable outlay for the sulfuric acid required in the decomposition, and the sulfur compounds resulting in the reaction must be subjected separately to further treatment.

According to the present invention thereactive nitrogen and the sulfur contained in thiocyanates can be recovered in the form of ammonium sulfate and free sulfur in a particularly simple and effective manner requiring no separate reagents such as sulfuric acid. Moreover, this conversion can be obtained in a single operation.

I have ascertained that if ammonium thiocyanate or other thiocyanates are heated with water, the hydrolytic decomposition of the thiocyanate according to the equation $$NH_4CNS + 2H_2O = H_2S + CO_2 + 2NH_3$$

which results in the formation of ammonia and hydrogen sulfide, is greatly promoted by the presence of compounds containing the radical $SO_2$, such as for instance sulfurous acid, thionates (viz polythionates and/or thiosulfate) together with sulfur dioxide, and the like. If the reaction mixture is heated for a sufficient period of time, which depends from the temperature, the whole of the thiocyanate may thus be decomposed.

It will be understood, that the hydrolytic reaction mentioned above proceeds to an equilibrium, which is unfavorably influenced by the final products formed in this same reaction, viz, hydrogen sulfide and ammonia. My investigations lead me to the assumption that the compounds containing the radical $SO_2$ instantaneously absorb hydrogen sulfide and ammonia, so that the equilibrium is favorably shifted, and the reaction is highly promoted; but I do not wish to be bound to this explanation.

In the practice of my invention I may use as a solution containing the compounds of the type mentioned above, the washing liquor, which results in the purification of coal distillation gases, such washing liquor containing either polythionates or corresponding quantities of thiosulfate and sulfur dioxide combined in the form of a complex compound. Such washing liquors are known to undergo decomposition if heated to a temperature of 150° C. or thereabouts, whereby ammonium sulfate, elementary sulfur, and, accidentally, free sulfuric acid are formed. If such liquors contain thiocyanates, they should be heated, in accordance with my invention, during a sufficient period of time, or to a higher temperature, in order to cause substantially all the thiocyanates to be decomposed.

It is well known that a complete decomposition of the sulfur compounds contained in these washing liquors into sulfate and free sulfur requires predetermined proportions of the several constituents, i. e. that for each molecule of a polythionate two molecules of sulfite or thiosulfate and for each two molecules of a bisulfite one molecule of sulfite or thiosulfate be present. If the quantities of sulfite or thiosulfate in solution are greater, complete decomposition is not possible inasmuch as in that case the solution contains besides sulfate also non-decomposed thiosulfate. If there is polythionate or bisulfite in excess in the solution, there is formed, when operating in closed vessels, besides ammonium sulfate a corresponding quantity of free sulfuric acid.

In my copending applications Serial Numbers 410,649, 410,650 and 410,651 I have described methods of decomposing thiocyanogen compounds by heating them with water in the presence of a thionate or a bisulfite or in the presence of a bisulfite, a polythionate and a thiosulfate. Although these methods may be considered, from a certain point of view, as specific ways of carrying out the present invention, they are not intended to form part of it, as far as they are protected by the said copending applications.

Before going into the details of my invention and how the same is carried out in practice, I will first explain the facts on which this invention is based.

First of all I found that ammonium thiocyanate can be decomposed in a quantitative manner by heating an aqueous solution thereof with sulfur dioxide, ammonium bisulfite or ammonium thiosulfate in combination with sulfur dioxide.

The following equation serves to illustrate this decomposition:

I. $NH_4CNS + 2H_2O + 2SO_2 =$
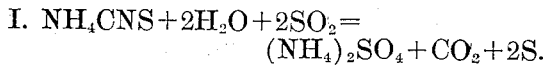
$(NH_4)_2SO_4 + CO_2 + 2S.$

This reaction can be explained as follows:

The decomposition of thiocyanic acid occurs according to the equation:

II. $HCNS + H_2O = NH_3 + COS.$

Carbon oxysulfide is further decomposed in contact with water according to the equation:

III. $COS + H_2O = CO_2 + H_2S.$

Thus from 1HCNS is finally formed 1NH$_3$ and 1H$_2$S.

If ammonium thiocyanate is treated in this way, 2NH$_3$ and 1H$_2$S will result.

In order to produce 1(NH$_4$)$_2$SO$_4$ from 1NH$_4$CNS, the sulfur dioxide must first be converted into SO$_3$ according to the equation:

IV. $3SO_2 = 2SO_3 + S.$
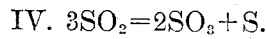

Therefore in order to obtain 1SO$_3$, 1.5SO$_2$ is required, which results in 1SO$_3$+0.5S.

Further in order to convert the hydrogen sulfide obtained in the decomposition of COS (Equation III) into sulfur, I require according to the equation:

V. $2H_2S + SO_2 = 3S + 2H_2O,$
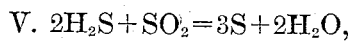

additional 0.5SO$_2$ per molecule ammonium thiocyanate.

If the above quantities of SO$_2$ are added, there results, that per molecule ammonium thiocyanate 2SO$_2$ are required, which furnish $0.5 + 1.5 = 2S$.

The above proves that Equation I is correct.

In order to carry this process through, 2SO$_2$ must be produced by oxidation of 2S per molecule ammonium thiocyanate. However, as just 2S are recovered in the process in the form of elementary sulfur, no extraneous sulfur at all is required in the process.

The conversion according to Equation I takes place slowly at ordinary temperature, while at 100° C. about 50 per cent of a 20 per cent solution of NH$_4$CNS will be decomposed in eight to ten hours. At a temperature between 180 and 200° C. the ammonium thiocyanate will be decomposed quantitatively in not more than two hours.

If operating with polythionate instead of sulfur dioxide, the reaction occurs according to the following equation:

VI. $NH_4CNS + 2H_2O + 2(NH_4)_2S_3O_6 =$
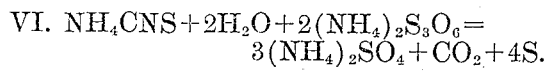
$3(NH_4)_2SO_4 + CO_2 + 4S.$ This reaction can be explained as follows:

According to the equation:

VII. $(NH_4)_2S_3O_6 = (NH_4)_2SO_4 + SO_2 + S$

1 molecule trithionate when heated, is decomposed into 1 molecule sulfate, 1SO$_2$+1S. If higher polythionates are used, the same compounds will result, but in that case more sulfur is obtained, for instance in the case of tetrathionate 2S, in the case of pentathionate 3S.

The Equation VII thus shows that here 1 polythionate is equivalent of 1SO$_2$.

The Equation VI further shows that by using trithionate 4S, by the use of tetra- and pentathionate 6 and 8S respectively are obtained.

The production of a polythionate, such as the trithionate from thiosulfate occurs according to the following equation:

VIII. $2(NH_4)_2S_2O_3 + 3SO_2 =$
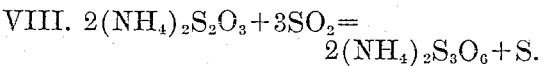
$2(NH_4)_2S_3O_6 + S.$

This reaction occurs in several intermediate steps, only one of which has hitherto been ascertained. When introducing sulfur dioxide into a solution of thiosulfate, in contradistinction to the treatment of thiosulfates with other acids no or very little sulfur will at first separate, and the solution will remain limpid and will at the same time assume a deep yellow color. The solution now contains an additive compound of 1 molecule thiosulfate and 1 molecule SO$_2$. The polythionate will form from these two compounds the formation occurring slowly at ordinary temperature and more rapidly upon heating.

If it is desired to produce sulfate from thiosulfate by way of a polythionate, the simplest method is that which follows the equation:

IX. $(NH_4)_2S_3O_6 + 2(NH_4)_2S_2O_3 = 3(NH_4)_2SO_4 + 4S$.

In order to satisfy this equation merely one-third of the thiosulfate must be converted into polythionate with the aid of sulfur dioxide. According to Equation VIII each molecule polythionate to be produced requires $1.5SO_2$, which shows that in order to convert thiosulfate into sulfate $0.5SO_2$ must be added per molecule thiosulfate.

Taking into consideration the Equations VIII and IX, the conversion of thiosulfate into sulfate occurs according to the equation:

X. $2(NH_4)_2S_2O_3 + SO_2 = 2(NH_4)_2SO_4 + 3S$.

The Equations VI and VIII further show that a mixture of ammonium thiosulfate and ammonium thiocyanate can be converted by means of sulfur dioxide into sulfate and sulfur according to the equation:

XI. $NH_4CNS + 2H_2O + 2(NH_4)_2S_2O_3 + 3SO_2 = 3(NH_4)_2SO_4 + CO_2 + 5S$

This equation shows how ammonium thiosulfate and ammonium thiocyanate can be converted directly into sulfate and sulfur by acting thereon with sulfur dioxide.

I may however also convert ammonium thiocyanate into sulfate and sulfur with the aid of ammonium bisulfite according to the equation:

XII. $NH_4CNS + 8NH_4HSO_3 = 5(NH_4)_2SO_4 + CO_2 + 2H_2O + 4S$.

This reaction can be explained as follows:

As shown in Equation I, $2SO_2$ are required per molecule $NH_4CNS$. On the other hand a mixture of 1 molecule ammonium sulfite and 2 molecules ammonium bisulfite when heated, will also be converted into sulfate and sulfur according to the equation:

XIII. $(NH_4)_2SO_3 + 2NH_4HSO_3 = 2(NH_4)_2SO_4 + S + H_2O$.

Now as $1NH_4CNS$ requires $2SO_2$, the double of the quantities shown in Equation XIII must be used. The $2SO_2$ are bound by the sulfite which is thus converted into bisulfite. This shows the way, in which the $8NH_4HSO_3$ are required according to Equation XII per molecule $NH_4CNS$.

All these conversions of ammonium thiocyanate take place slowly at ordinary temperature, more rapidly at an elevated temperature. At about 100° C. about one-half of the ammonium thiocyanate is decomposed within eight to ten hours, while at 180–200° C. the conversion will be completed in one to two hours, all ammonium thiocyanate having disappeared.

If less sulfur dioxide, bisulfite or polythionate is used than corresponds to the respective equations, the reaction will not be complete and the liquor will usually still contain some ammonium thiosulfate and non-decomposed ammonium thiocyanate. On the other hand an excess of sulfur dioxide, bisulfite or polythionate will not be harmful, the conversion being quantitative and the excess of sulfur dioxide being converted into sulfuric acid and sulfur according to Equation IV. In this case the liquor contains more or less sulfuric acid, which can be neutralized by adding ammonia before evaporation.

The process is preferably carried through at a temperature which materially exceeds 154° C., for instance at 175° or above, and under increased pressure. At any rate, the reaction mixture should be kept at a sufficiently elevated temperature until substantially the whole of the thiocyanate is decomposed. The ammonium thiocyanate may be contained in the liquor from the beginning. If in the purification of coal distillation gases the contents of cyanogen compounds are recovered separately under the form of ammonium thiocyanate, the solution thus obtained may be added to the washing liquor serving for removing from the gas ammonia and hydrogen sulfide. One may however also conduct the washing process in such manner that the contents of cyanogen compounds, ammonia and hydrogen sulfide in the gases are washed out in a single operation.

On the other hand, if the ammonium thiocyanate is recovered in a separate washing operation, it is also possible to force the solution of ammonium thiocyanate thus obtained, which may be preheated into the heated decomposition vessel. In a similar manner a polythionate solution containing ammonium thiocyanate, which may be preheated if desired, may also be forced into the heated conversion chamber.

*Example 1*

168.3 kgs. sulfur dioxide are introduced into a solution of 100 kgs. ammonium thiosyanate in 200 kgs. water, the solution being contained in a closed pressure resisting vessel. The liquor thus treated is then heated under pressure to about 180° C. After four to six hours the ammonium thiocyanate is decomposed into sulfate and sulfur and there results 274 kgs. of an ammonium sulfate solution, containing 173.7 kgs. ammonium sulfate. There is further obtained 84.3 kgs. pure molten sulfur and 57.8 kgs. carbon dioxide gas which may be tapped off. The pressure vessel may be provided with an acid-proof brick lining or with a lining of chrome-nickel-steel, which resists the action of sulfur dioxide. The vessel may however also be made of chrome-nickel-steel altogether.

I may also introduce the sulfur dioxide gradaully during the heating.

If the reaction is carried through at 220° C., the conversion will already be complete in one to two hours, while at lower temperature longer heating is required.

*Example 2*

Into a solution of 100 kgs. calcium thiocyanate in 100 kgs. water are introduced 164 kgs. sulfur dioxide and the liquor is treated as described with reference to Example 1. The resulting liquor contains 84.6 kgs. ammonium sulfate, besides which there are obtained 87.2 kgs. calcium sulfate, 82.2 kgs. sulfur and 56.4 kgs. carbon dioxide.

*Example 3*

Into a solution of 100 kgs. ammonium thiocyanate in 500 kgs. water 219 kgs. sulfur dioxide are introduced and the liquor is further treated as described with reference to Example 1. There is obtained 173.6 kgs. ammonium sulfate, and 50.8 kgs. free sulfuric acid, further 92.7 kgs. free molten sulfur and 57.8 kgs. carbon dioxide.

*Example 4*

Into a solution of 100 kgs. ammonium thiocyanate and 389.3 kgs. ammonium thiosulfate in 400 kgs. water are introduced 252.5 kgs. sulfur dioxide. The liquor is treated as described with reference to Example 1. There results a watery solution of 520.7 kgs. ammonium sulfate, and 210.7 kgs. pure molten sulfur besides 57.8 kgs. carbon dioxide.

*Example 5*

Into a solution of 100 kgs. ammonium thiocyanate and 1559 kgs. ammonium thiosulfate in 1500 kgs. water are introduced 505.3 kgs. sulfur dioxide and the liquor is treated as described with reference to Example 1. There results a watery solution containing 1562 kgs. ammonium sulfate besides 589.3 kgs. of pure molten sulfur and 57.8 kgs. carbon dioxide.

*Example 6*

Into a solution of 100 kgs. ammonium thiocyanate and 389.2 kgs. ammonium thiosulfate in 500 kgs. water are introduced 336.7 kgs. sulfur dioxide. The solution is treated as described with reference to Example 1. The resulting watery solution contains 520.7 kgs. ammonium sulfate and 85.9 kgs. free sulfuric acid. There are further obtained 224.5 kgs. pure molten sulfur and 57.8 kgs. carbon dioxide.

In the claims the term "compound containing the radical $SO_2$" is intended to comprise sulfur dioxide as well as all the compounds resulting therefrom, including thionates and thiosulfates.

Various changes may be made in the details disclosed in the foregoing specification without departing from the invention or sacrificing the advantages thereof.

I claim:—

1. The method of decomposing thiocyanates and of producing ammonium compounds therefrom, comprising heating an aqueous solution of thiocyanates in the presence of a compound containing the radical $SO_2$ and maintaining the reaction mixture at an elevated temperature until substantially all the thiocyanates are decomposed.

2. The method of decomposing thiocyanates and of producing ammonium compounds therefrom, comprising heating an aqueous solution of thiocyanates in the presence of a compound containing the radical $SO_2$ and maintaining the reaction mixture at a temperature above 170° C. until substantially all the thiocyanates are decomposed.

3. The method of decomposing thiocyanates and of producing ammonium compounds therefrom, comprising heating an aqueous solution of thiocyanates in the presence of a compound containing the radical $SO_2$ and maintaining the reaction mixture at a temperature of about 180–220° C. until substantially all the thiocyanates are decomposed.

4. The method of decomposing thiocyanates and of producing ammonium compounds therefrom, comprising heating an aqueous solution of thiocyanates in the presence of a compound containing the radical $SO_2$ and keeping the reaction mixture under pressure at a temperature above 170° C., until substantially all the thiocyanates are decomposed.

5. The method of decomposing thiocyanates and of producing ammonium compounds therefrom, comprising heating an aqueous solution of such thiocyanates in the presence of a compound containing the radical $SO_2$ and keeping the reaction mixture under pressure at a temperature of about 180–220° C., until substantially all the thiocyanates are decomposed.

6. The method of decomposing thiocyanates and of producing ammonium compounds therefrom, comprising heating an aqueous solution of thiocyanates in the presence of a thionate and of sulfur dioxide and holding the reaction mixture at an elevated temperature until substantially all the thiocyanates are decomposed.

7. The method of decomposing thiocyanates and of producing ammonium compounds therefrom, comprising heating an aqueous solution of thiocyanates in the presence of a thionate and of sulfur dioxide and holding the reaction mixture at a temperature about 180–220° C., until substantially all the thiocyanates are decomposed.

8. The method of decomposing thiocyanates and of producing ammonium compounds therefrom, comprising heating an aqueous solution of thiocyanates in the presence of an ammonium polythionate and sulfur dioxide and holding the reaction mixture at an elevated temperature until substantially all the thiocyanates are decomposed.

In testimony whereof I affix my signature.

CHRISTIAN J. HANSEN.